(12) United States Patent
Sakaguchi

(10) Patent No.: US 6,983,954 B2
(45) Date of Patent: Jan. 10, 2006

(54) AIRBAG MODULE FOR MOTOR VEHICLES

(75) Inventor: Takashi Sakaguchi, Möbris (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 10/879,185

(22) Filed: Jun. 30, 2004

(65) Prior Publication Data

US 2004/0262890 A1 Dec. 30, 2004

(30) Foreign Application Priority Data

Jun. 30, 2003 (DE) .......................... 203 10 345 U

(51) Int. Cl.
*B60R 21/16* (2006.01)
(52) U.S. Cl. .................... 280/728.2; 280/731; 280/732
(58) Field of Classification Search ............. 280/728.1, 280/728.2, 731, 732
See application file for complete search history.

(56) References Cited

U.S. PATENT DOCUMENTS

| | | | |
|---|---|---|---|
| 5,730,459 A * | 3/1998 | Kanda .......................... | 280/731 |
| 5,813,692 A | 9/1998 | Faigle et al. | |
| 5,826,901 A * | 10/1998 | Adomeit ................... | 280/728.2 |
| 6,176,511 B1 * | 1/2001 | Adkisson et al. ........ | 280/728.2 |
| 6,286,858 B1 * | 9/2001 | Shepherd et al. ........ | 280/728.2 |

FOREIGN PATENT DOCUMENTS

| | | |
|---|---|---|
| DE | 44 35 451 A1 | 6/1995 |
| DE | 44 30 588 C1 | 10/1995 |
| DE | 197 51 991 A1 | 5/1998 |
| DE | 101 61 446 A1 | 7/2003 |
| GB | 2 292 353 A | 2/1996 |

OTHER PUBLICATIONS

Movable Air Bag Module; *Kenneth Mason Publications*, Hampshire, GB Bd. 424, Nr. 64, Aug. 1999 2pp.

* cited by examiner

*Primary Examiner*—Paul N. Dickson
*Assistant Examiner*—Toan C. To
(74) *Attorney, Agent, or Firm*—Foley & Lardner LLP

(57) ABSTRACT

An airbag module including a housing for accommodating at least one gas generator and at least one airbag. The housing is not connected to the dashboard and may move away from the occupant. The housing my include at least one pair of brackets comprising a first deformable bracket for fastening the housing on a vehicle cross member and a second bracket, which is provided with a slot extending essentially in the direction of movement of the housing, for guiding at least one connecting element during the movement of the housing and for damping this movement, the connecting element connecting the first bracket to the vehicle cross member.

19 Claims, 6 Drawing Sheets

AIRBAG MODULE FOR MOTOR VEHICLES

BACKGROUND

The present invention relates generally to airbag modules, more particularly air bag modules having a housing for accommodating at least one gas generator and at least one airbag.

Airbags have become a common feature in automobile vehicles. However, it has been discovered that there is a need for an airbag module that can provide a damping motion in the event of a vehicle accident. For instance, Patent DE 44 30 588 discloses an airbag system which can at least partially move away from the vehicle occupant. For this purpose the housing for accommodating the gas generator and the airbag is fastened on plastically deformable or resilient elements to absorb energy. The intention as a result is to prevent an occupant who, in the event of a crash, is not sitting upright but rather is bent forwards and has his head within the space provided for the inflatable airbag, from being injured by the airbag and possibly by parts of the covering cap of the airbag module. Furthermore, gas-filled compression springs are additionally provided likewise for absorbing energy and for damping the movement.

German Published Specification DE 197 51 991 A1 (incorporated by reference herein) discloses an airbag module, in which the housing for accommodating the gas generator and the airbag is fastened, on the one hand, to the dashboard by means of deformable flanges and, on the other hand, to the substructure of the dashboard by means of deformable elements. These deformable flanges and deformable elements are likewise intended to absorb energy when the vehicle occupant strikes his/her head against them, by a damped movement of the housing away from the vehicle occupant.

It is therefore known to provide two different elements for absorbing energy and for damping the movement of the housing. The disadvantage of these described arrangements is that the construction of the airbag module is too complicated, and so the outlay on manufacturing, in particular for the two deformation or damping elements in each case, and also their installation costs are too high. Thus, there is a need for an airbag module that allows for a less complicated construction and lower installation cost while providing energy absorption and damping movement.

SUMMARY

An object of an embodiment of the present invention is to simplify the construction of an airbag module having a housing which can move away from the occupant, in order to reduce manufacturing and installation costs.

In the case of an airbag module having a housing for accommodating at least one gas generator and at least one airbag, there being no connection between the housing and the dashboard and it being possible for the housing to move away from the occupant, the housing has, of the invention, at least one pair of brackets comprising a first deformable bracket for fastening the housing on a vehicle cross member and a second bracket, which is provided with a slot extending essentially in the direction of movement of the housing, for guiding at least one connecting element during the movement of the housing and for damping this movement, the connecting element connecting the first bracket to the vehicle cross member.

This airbag module is therefore provided with just two brackets, which are connected to the housing, and a connecting element as different elements for absorbing energy and damping the movement of the housing when the head strikes against the airbag module, with energy primarily being absorbed by the interaction of the slot with the connecting element. Owing to the small number of components, both the outlay on manufacturing and also on installation are reduced.

In one variant, at least one edge of the slot can be deformed by the connecting element during the movement of the slot relative to the connecting element, as a result of which a damping effect is obtained during the displacement of the housing away from the occupant. A further possibility for obtaining damping is for the connecting element to be deformable during the movement of the slot relative to the connecting element or by the deformation of both elements being used.

The damping can be obtained by the fact that the slot is reduced in the second bracket, in the direction of the bottom of the housing, to a width which is smaller than the width or the diameter of the connecting element. As a result, during the displacement of the housing away from the occupant an increasing amount of force has to be applied for the deformation of the slot wall and of the connecting element, as a result of which the damping increases with continuing displacement of the housing away from the occupant.

In one embodiment the width of the slot is preferably continuously reduced. Of another embodiment, provision is made for both edges of the slot to taper towards each other obliquely with respect to the direction of movement of the housing. In a second embodiment, a first edge of the slot runs parallel to the direction of movement of the housing while the other edge tapers obliquely towards this first edge. In a third embodiment, the edges of the slot run parallel to each other and obliquely with respect to the direction of movement of the housing.

Furthermore, it is possible for the slot to be reduced in the direction of the housing bottom initially to a width which is smaller than the width or the diameter of the connecting element, and for the edges then to run parallel. In addition, the slot can be widened at its end facing the housing bottom to a width which corresponds to the width or the diameter of the connecting element. In this case, i.e. in the end phase of the displacement of the housing, the slot is no longer deformed, i.e. the walls of the slot no longer absorb any energy. This widening of the slot width serves for the predetermined reaching of the end position taking the manufacturing tolerances of the fit between the slot and the connecting element into consideration.

In one embodiment, the slot is widened continuously to the width which corresponds to the width or the diameter of the connecting element. Furthermore, it is also possible for the width of the slot to be continuously reduced again from this width towards its end facing the housing bottom. The effect achieved by this is that, after the absorption of energy is reduced, an increase in the absorption of energy is obtained once again.

A screw whose shank extends through the slot is preferably provided as the connecting element. With this simple connecting element, in addition to the mounting of the housing, the additional damping in conjunction with the slot of the second bracket is obtained.

The brackets are arranged at such a distance from one another that there is space for a nut for a screw connection between the first bracket and the vehicle cross member. The first bracket is connected to the vehicle cross member preferably via a mount fastened to the said vehicle cross member. The brackets are connected to the housing preferably at the bottom thereof.

The first deformable bracket can be both deformed in its entirety and can also have a deformable weak point or can have both characteristics, with, in the last-mentioned case, the weak point being designed in such a manner that it is first of all deformed in an expedient manner. A kink, for example, may be provided as the deformable weak point.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Of an embodiment of the present invention, an airbag module is provided that allows for a less complicated construction and lower installation cost while providing energy absorption and damping movement.

Figure 1:
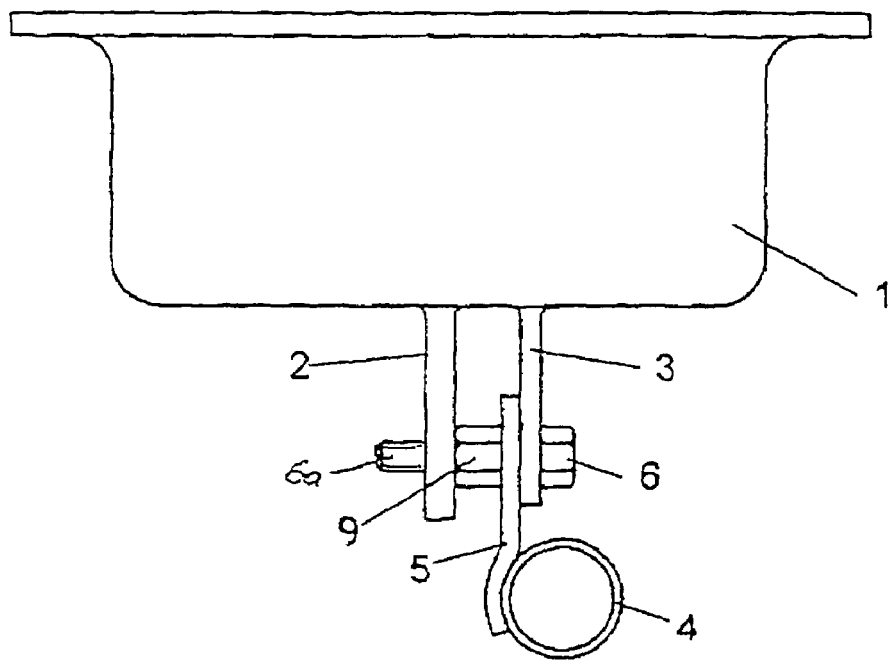
FIG. 1 shows the side view of a housing for accommodating a gas generator and airbag with a first embodiment of a fastening of the housing and of a slot in a guide bracket before the impact of an occupant's head.
Figure 2:
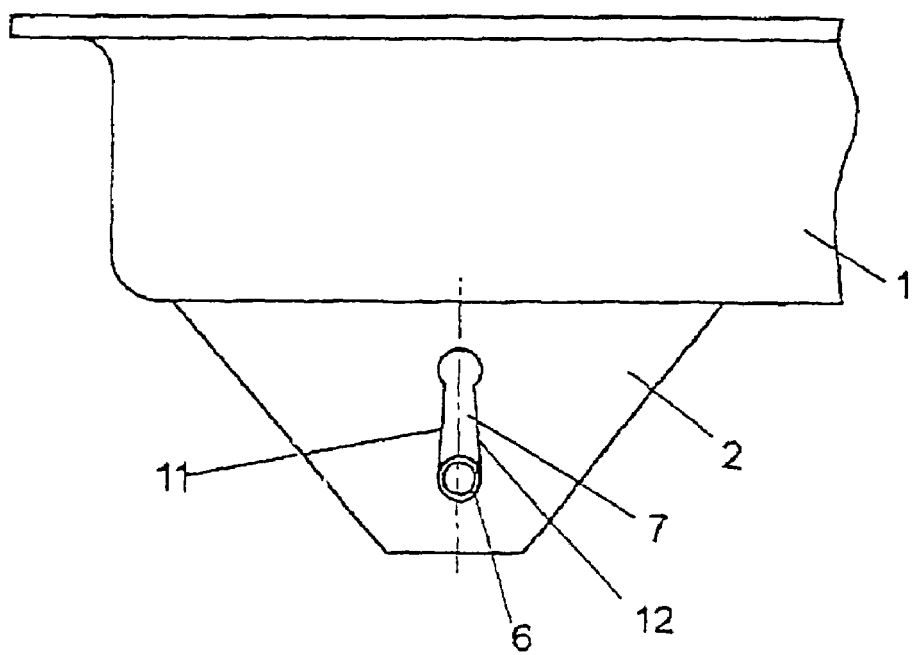
FIG. 2 shows the embodiment of FIG. 1 before the impact of an occupant's head in a view from the front.

Referring now to the figures, FIG. 1 schematically illustrates a housing 1 for accommodating a gas generator (not illustrated) and an airbag (likewise not illustrated). The housing is preferably a cast housing of magnesium die-casting or a plastic housing which has been injection-molded as a single part. A first bracket 3 and a second bracket 2 as guide bracket are fastened to the bottom of the housing 1. The first bracket 3 serves for fastening the housing 1 to a vehicle cross member 4 by means of a mount 5, which is fastened to the said vehicle cross member, and a screw 6 as the connecting element. The brackets 2, 3 lie parallel to each other and are at such a distance from each other that a nut 9 can be moved between them. The shank 6a of the screw 6 penetrates a slot 7 (FIG. 2) in the second bracket 2 at its lower end 7a, at which the width of the slot corresponds approximately to the diameter of the shank 6a. In this first embodiment, the slot is continuously reduced in the direction of the housing bottom to a width which is smaller than the diameter of the shank 6a of the screw 6, i.e. the edges 11, 12 taper towards each other. At the upper end 7b, the slot is widened again to a width which corresponds approximately to the diameter of the shank 6a of the screw 6.

This described mounting arrangement can be provided a number of times, preferably twice, in order to achieve a secure mounting of the housing 1.

Figure 4:
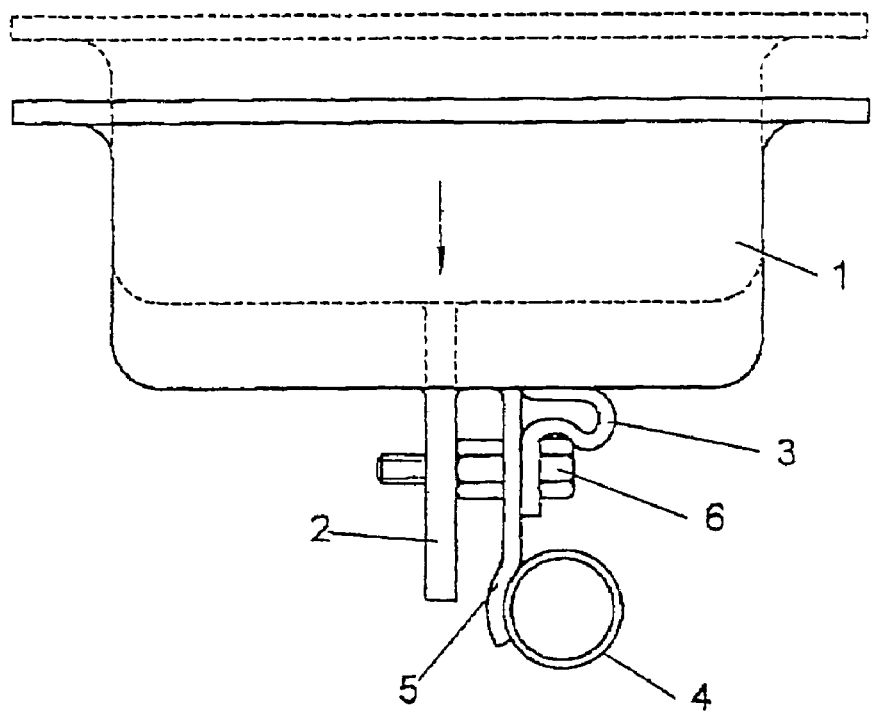
FIG. 4 shows the side view of the embodiment of FIG. 1 after the impact of an occupant's head.
Figure 5:
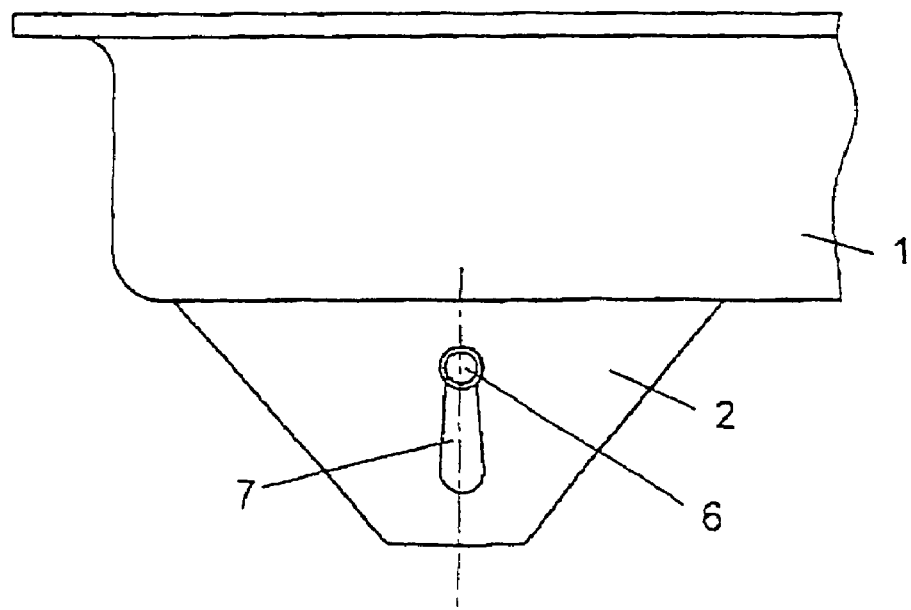
FIG. 5 shows the view from the front of the embodiment of FIG. 1 after the impact of an occupant's head.

In the rest position which is illustrated in FIG. 1, the shank of the screw 6 bears against the lower end of the slot 7. If the housing 1 is now displaced away from the occupant by his head impacting on it, as illustrated in FIG. 4 where the direction of movement has been depicted by the arrow, the first bracket 3 is deformed and in the process absorbs energy. The slot 7 is displaced at the same time as the bracket 2. In the process, the shank of the screw 6 enters increasingly into regions of the slot which are narrower than its diameter. As a consequence of the resultantly occurring deformation of the edges 11, 12, i.e. the expansion of the slot 7 and/or of the shank, an increasing amount of energy is absorbed, i.e. the movement of the housing 1 away from the occupant is damped. This interaction of the slot 7 with the shank 6a enables most of the energy produced during the impact of the head to be absorbed while the fraction of the absorption of energy by means of the bracket 3 is, in contrast, small. At the end of the movement, the shank of the screw 6 bears against the upper end of the slot 7, as illustrated in FIG. 5.

Figure 3:
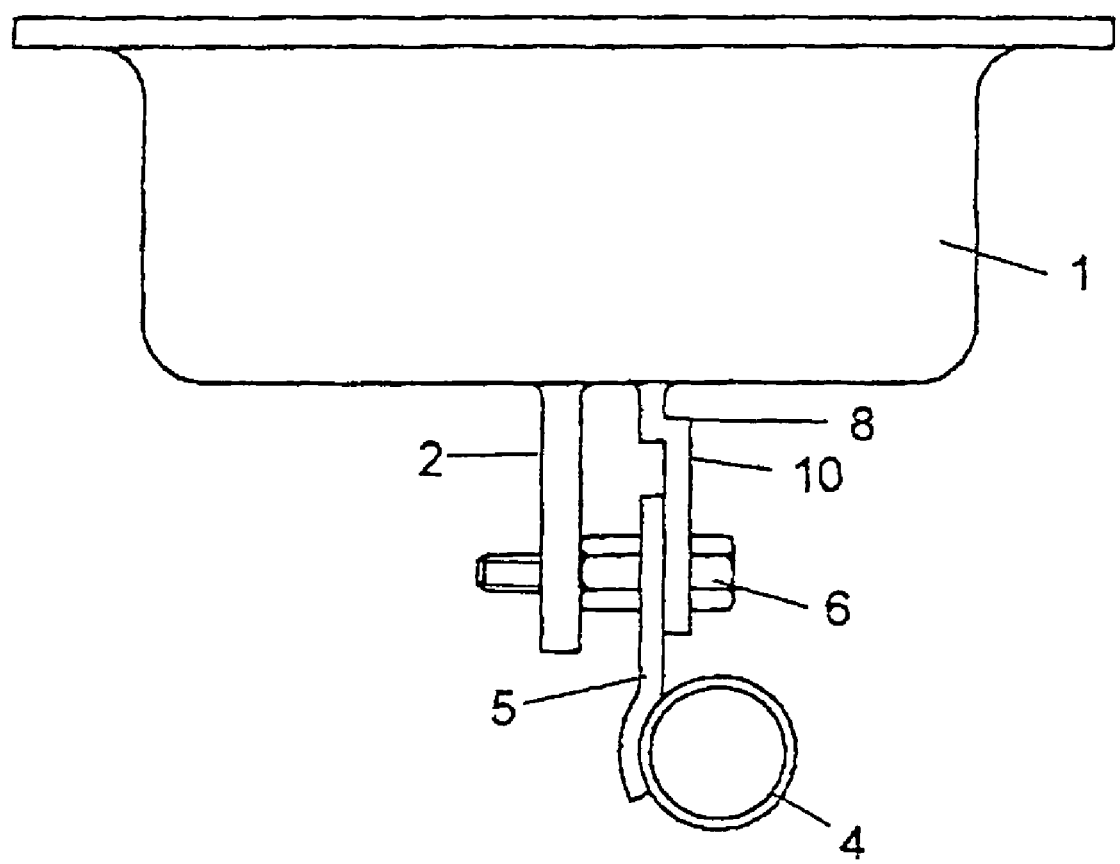
FIG. 3 shows the side view of a housing for accommodating a gas generator and airbag with a second embodiment of a fastening of the housing before the impact of an occupant's head.

In the embodiment of FIG. 3, the first bracket 10 has a kink 8 as the deformable weak point. In this embodiment, during a head impact the first bracket 10 buckles first of all at this point. In addition, when the housing 1 is subjected to a further load, the remaining region of the first bracket 10 can also be deformed.

Figure 6:
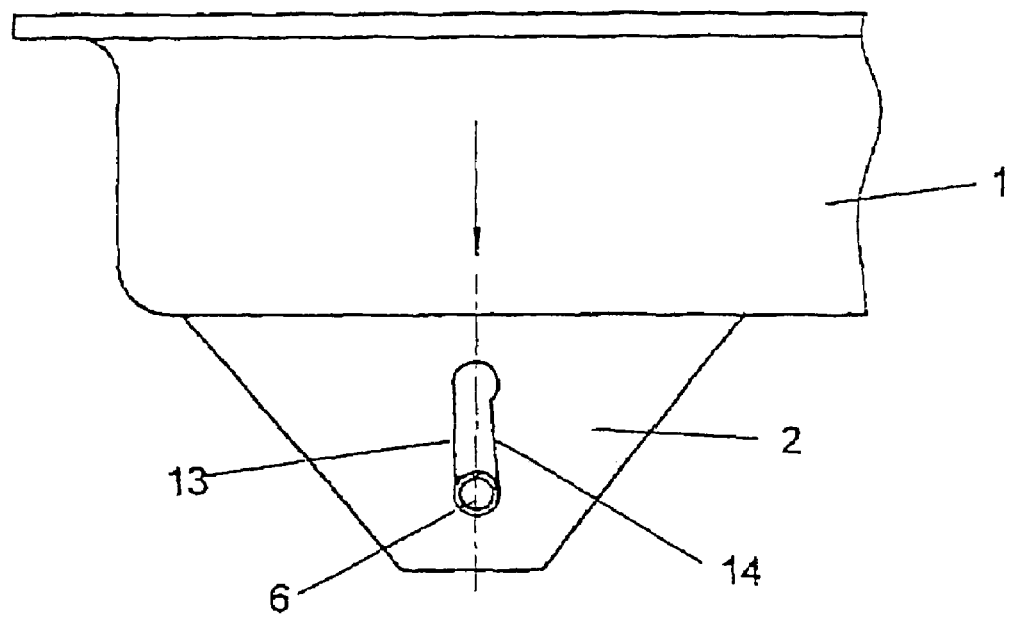
FIG. 6 shows the side view of a housing with a second embodiment of a slot in a guide bracket.
Figure 7:
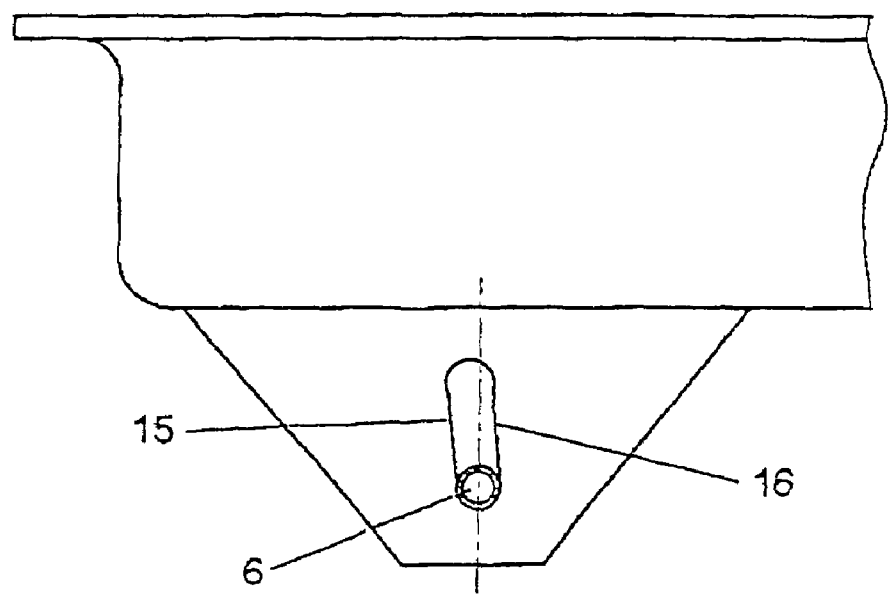
FIG. 7 shows the side view of a housing with a third embodiment of a slot in a guide bracket.

FIG. 6 illustrates a second embodiment of the slot in the second bracket 2. One edge 13 of the slot there runs parallel to the direction of movement of the housing 1 while the second edge 14 tapers obliquely towards the first edge 13. In this embodiment too, the width of the slot is reduced in the direction of the bottom of the housing 1.

In the embodiment of FIG. 6, the edges 15, 16 of the slot run parallel to each other but obliquely with respect to the direction of movement of the housing. In this embodiment, the width of the slot is constant. A damping of the movement of the housing is achieved, in this embodiment, primarily by the deformation of the edge 16, but also by the deformation of the shank of the screw 6.

In the force-travel diagrams illustrated in FIGS. 8 to 11, the slots are illustrated rotated through 90° with respect to the previous illustrations, in which case the left end of the slot is its lower end and the right end is that end of the slot which faces the housing bottom. In all of the figures, the shank 6a bears in its starting position against the lower end of the slot, i.e. against the left end in the illustration of FIGS. 8 to 11.

Figure 8:
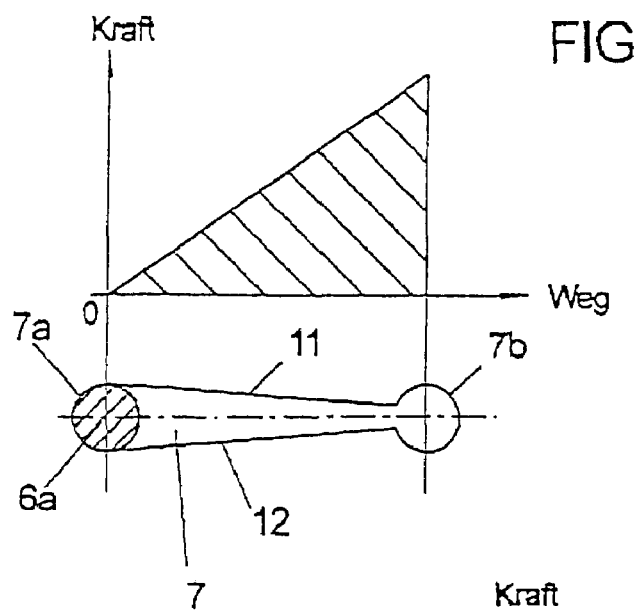
FIG. 8 illustrates a force-travel diagrams for one embodiment of the slot.

FIG. 8 illustrates a force-travel diagram for a slot 7, the width of which is continuously reduced starting from the lower end 7a. This embodiment corresponds to the embodiment illustrated in FIGS. 1, 2 and 5. Owing to the continuous decrease in the slot width the absorption of energy by the walls of the slot during the displacement thereof relative to the shank 6a increases linearly until it is abruptly ended at the other end 7b of the slot because of the widening which is present there to the diameter of the shank 6a.

Figure 9:
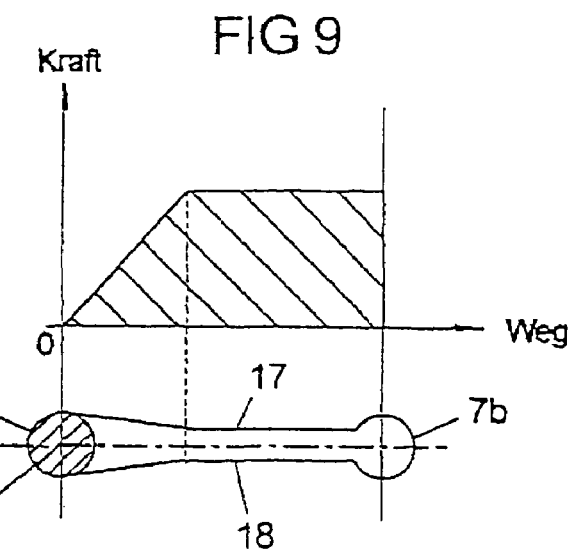
FIG. 9 illustrates a force-travel diagrams for another embodiment of the slot.

In the embodiment of FIG. 9, the width of the slot 7 first of all decreases continuously. The width then remains constant until the widening at the other end 7b of the slot, i.e. the edges 17, 18 run parallel. As a result, the absorption of energy by the walls of the slot during the displacement thereof relative to the shank 6a first of all increases linearly, then remains constant in the region of the constant width of the slot and is abruptly ended at the other end 7b, as in the embodiment of FIG. 8.

Figure 10:
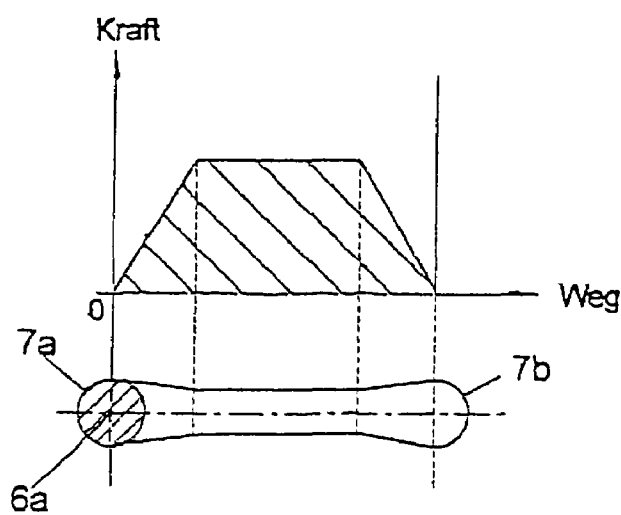
FIG. 10 illustrates a force-travel diagrams for another embodiment of the slot.

In the case of the slot in the embodiment of FIG. 10, the width first of all decreases continuously, then remains constant over a predetermined length and then widens again continuously as far as the widening to the diameter of the shank 6a at the other end 7b of the slot. As a result, the absorption of energy by the walls of the slot during the displacement thereof relative to the shank 6a first of all increases linearly, then remains constant in the region of the constant width of the slot and then decreases linearly again in the region of the continuous widening.

Figure 11:
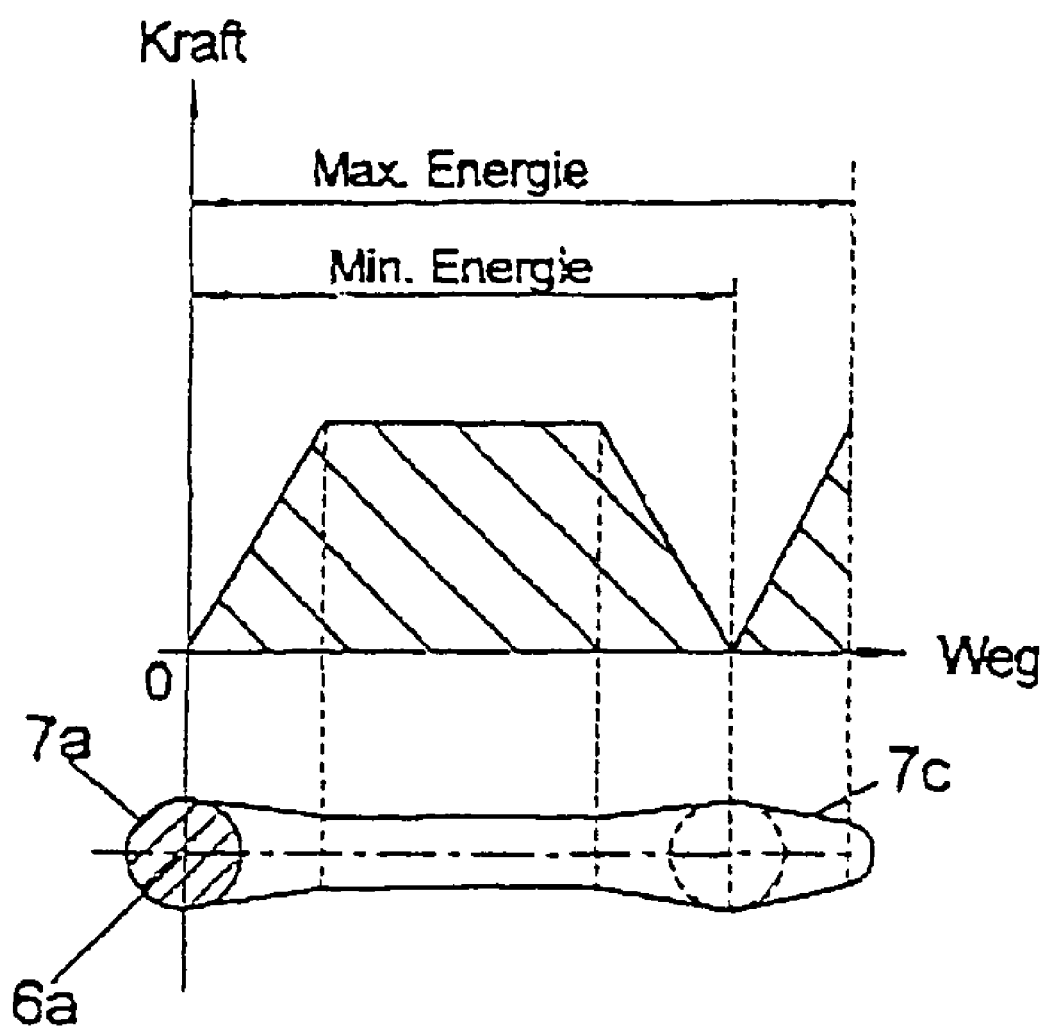
FIG. 11 illustrates a force-travel diagrams for another embodiment of the slot.

The embodiment of FIG. 11 corresponds essentially to the embodiment of FIG. 10. Here too, the slot is first of all widened again to the diameter of the shank 6a at the end 7a. However, the width of the slot 7 is then reduced again continuously. In contrast to the force-travel diagram of FIG. 10, after the absorption of energy has decreased, the walls of the slot during the displacement thereof relative to the shank 6a absorb energy anew, as can be seen from the right section of the force-travel diagram of FIG. 11.

These embodiments which have been illustrated make it possible to see that the absorption of energy during the impact of a head can be influenced in a simple manner by the differing configuration of the slot.

Germany Priority Application 203 10 345.9, filed Jun. 30, 2003 including the specification, drawings, claims and abstract, is incorporated herein by reference in its entirety.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. An airbag module comprising:
 a housing for accommodating at least one gas generator and at least one airbag;
 wherein the housing includes at least one pair of brackets comprising a first deformable bracket for fastening the housing on a vehicle cross member and a second bracket;
 wherein the second bracket includes a slot extending essentially in the direction of movement of the housing, for guiding at least one connecting element during the movement of the housing and for damping this movement;
 wherein the first bracket is configured to be connected by the connecting element to the vehicle cross member;
 wherein the module is configured so that there is no connection between the housing and a vehicle dashboard and wherein the housing is configured to move away from the occupant.

2. The airbag module of claim 1, wherein at least one edge of the slot is configured to be deformed by the connecting element during the movement of the slot relative to the connecting element to thereby provide damping.

3. The airbag module of claim 1, wherein the connecting element is configured to deform during movement of the slot relative to the connecting element to thereby provide damping.

4. The airbag module according claim 1, wherein the width of the slot reduces in the direction of the bottom of the housing to a width which is smaller than the width or diameter of the connecting element.

5. The airbag module of claim 1, wherein the width of the slot is continuously reduced in the direction of the bottom of the housing.

6. The airbag module of claim 1, wherein both edges of the slot taper towards each other obliquely with respect to the direction of movement of the housing.

7. The airbag module of claim 1, wherein a first edge of the slot runs parallel to the direction of movement of the housing while the other edge tapers obliquely towards the first edge.

8. The airbag module according claim 1, wherein the edges of the slot run parallel to each other and obliquely with respect to the direction of movement of the housing.

9. The airbag module of claim 4, wherein the slot is configured so that after the width of the slot is reduced to a width which is smaller than a width or a diameter of the connecting element, the edges of the slot then run parallel.

10. The airbag module of claim 1, wherein the slot is widened at an end facing the housing bottom to a width which corresponds to a width or a diameter of the connecting element.

11. The airbag module of claim 10, wherein the slot is widened continuously.

12. The airbag module of claim 1, wherein the width of the slot is continuously reduced at an end facing the bottom of the housing from the width which corresponds to the diameter of the connecting element.

13. The airbag module of claim 4, wherein the connecting element comprises a screw including a shank extending through the slot.

14. The airbag module of claim 4, wherein the brackets are arranged to separated at a distance so that there is space for a nut for a screw connection between the first bracket and the vehicle cross member.

15. The airbag module of claim 1, wherein the first bracket is configured to be connected to the vehicle cross member via a mount fastened to the said vehicle cross member.

16. The airbag module of claim 1, wherein the brackets are connected to the bottom of the housing.

17. The airbag module of claim 1, wherein the first deformable bracket can be deformed in its entirety.

18. The airbag module of claim 1, wherein the first deformable bracket comprises a deformable weak point.

19. The airbag module of claim 18, wherein the deformable weak point comprises a kink.

* * * * *